US007631897B2

(12) United States Patent
Kartiala

(10) Patent No.: US 7,631,897 B2
(45) Date of Patent: Dec. 15, 2009

(54) VEHICLE LEVELING DEVICE

(76) Inventor: Tauno Tapio Kartiala, 12716 Dorina Pl., Granada Hills, CA (US) 91344

( * ) Notice: Subject to any disclaimer, the term of this patent is extended or adjusted under 35 U.S.C. 154(b) by 580 days.

(21) Appl. No.: 11/125,471

(22) Filed: May 10, 2005

(65) Prior Publication Data

US 2006/0255563 A1 Nov. 16, 2006

(51) Int. Cl.
*B60S 9/002* (2006.01)

(52) U.S. Cl. ....................... 280/764.1; 254/45; 248/352

(58) Field of Classification Search ................ 280/6.15, 280/764.1; 254/93 H, 93, 88, 45, 33, 50, 254/84, 91; 248/124.2, 142, 352
See application file for complete search history.

(56) References Cited

U.S. PATENT DOCUMENTS 1,661,882 A * 3/1928 Derrick .................... 254/89 R
1,929,572 A * 10/1933 Weller ......................... 254/88
2,142,379 A * 1/1939 Sharkey ...................... 254/126
2,190,491 A * 2/1940 Sharkey ....................... 254/88
2,515,911 A 7/1950 Thomas
2,568,827 A * 9/1951 Schallock ............... 254/133 R
2,606,735 A * 8/1952 Zembrosky et al. ......... 248/352
2,621,940 A * 12/1952 Gorham ...................... 280/475
2,789,788 A * 4/1957 Wilson ....................... 254/2 B
2,974,490 A * 3/1961 Hott ............................ 60/402
3,035,812 A * 5/1962 Wineteer .................... 254/2 R
3,252,590 A * 5/1966 Nielsen ...................... 414/678
3,768,778 A * 10/1973 Ames ......................... 254/2 B
3,802,658 A 4/1974 Binding
3,834,669 A * 9/1974 Reid ...................... 254/133 R
4,108,421 A 8/1978 Extine
4,377,190 A * 3/1983 Pierrat ..................... 144/195.1
4,461,456 A 7/1984 Munna
4,479,634 A * 10/1984 Blatz ...................... 254/133 R
4,534,543 A * 8/1985 Gray ............................. 254/1
5,039,070 A * 8/1991 Warner ........................ 254/94
5,271,603 A * 12/1993 White ...................... 254/10 C
5,340,082 A * 8/1994 Holloway .................... 254/88
5,375,814 A * 12/1994 Marjama .................... 254/124
5,641,150 A 6/1997 Rober
5,678,973 A * 10/1997 Cox ........................... 414/341
5,769,397 A * 6/1998 Dhein ........................ 254/134

(Continued)

OTHER PUBLICATIONS www.campingworld.com, BAL Light Trailer Tire Leveler, Catalog Item # 21017.

*Primary Examiner*—Paul N. Dickson
*Assistant Examiner*—Timothy Wilhelm
(74) *Attorney, Agent, or Firm*—Edward S. Wright

(57) ABSTRACT

Vehicle leveling device having a stand which, in use, is positioned on the ground next to a wheel of a vehicle, a lever beam which extends laterally from the stand and beneath the wheel with a proximal end portion of the lever beam being mounted on the stand for movement between raised and lowered positions and a distal end portion of the lever beam resting on the ground beneath the vehicle, a jack for raising the proximal end portion of the lever beam on the stand, with the distal end portion bearing on the ground and serving as a fulcrum for the lever beam in lifting the wheel, and a lock for holding the proximal end portion of the lever beam in a fixed position on the stand with the wheel in a raised position.

16 Claims, 4 Drawing Sheets

U.S. PATENT DOCUMENTS

| | | | | |
|---|---|---|---|---|
| 6,199,825 | B1 | 3/2001 | Johnson et al. | |
| 6,443,413 | B1 | 9/2002 | Hawkins et al. | |
| 6,561,487 | B2 * | 5/2003 | Siglock | 254/134 |
| 6,769,668 | B2 * | 8/2004 | Siglock | 254/124 |
| 6,918,575 | B2 * | 7/2005 | Cadrain et al. | 254/88 |
| 6,986,503 | B2 * | 1/2006 | Arzouman | 254/8 B |
| 7,222,838 | B1 * | 5/2007 | Ji | 254/88 |
| 2002/0121632 | A1 * | 9/2002 | Siglock | 254/133 R |
| 2003/0160221 | A1 * | 8/2003 | Dunbar et al. | 254/88 |
| 2003/0218156 | A1 * | 11/2003 | Arzouman | 254/8 B |
| 2003/0218157 | A1 * | 11/2003 | Arzouman | 254/8 B |
| 2004/0110570 | A1 * | 6/2004 | Hutchon et al. | 473/161 |
| 2005/0218384 | A1 * | 10/2005 | Hernandez et al. | 254/10 B |
| 2005/0253122 | A1 * | 11/2005 | Jones | 254/88 |
| 2007/0114500 | A1 * | 5/2007 | Hernandez, Jr. | 254/1 |

* cited by examiner

VEHICLE LEVELING DEVICE

BACKGROUND OF THE INVENTION

1. Field of Invention

This invention pertains generally to the leveling of parked vehicles and, more particularly, to the leveling of recreational vehicles such as motor homes, house trailers, pickup trucks with campers, and the like.

2. Related Art

When parked on uneven terrain, recreational vehicles are most commonly leveled by driving them onto one or more blocks. This is usually a trial and error procedure which can require rolling the vehicle onto and off of the blocks multiple times and seldom results in more than a very rough leveling of the vehicle.

A leveler for lightweight, single axle trailers is available commercially under the name BAL® Light Trailer Tire Leveler, with BAL being a registered trademark of Norco Industries, Inc., Compton, Calif. It has a pair of U-shaped arms which are hinged together at their distal ends, with a screw extending between the base portions of the arms for raising one of the arms at an angle to the other. The device is placed flat on the ground with the arms embracing the tire on the lower side of the trailer, and the screw is turned to raise the tire. This device can only lift the tire a short distance off the ground and can only be used with trailers of relatively light weight.

OBJECTS AND SUMMARY OF THE INVENTION

It is in general an object of the invention to provide a new and improved device for leveling recreational vehicles and the like.

Another object of the invention is to provide a device of the above character which overcomes the limitations and disadvantages of the techniques and devices heretofore employed in leveling parked vehicles.

These and other objects are achieved in accordance with the invention by providing a vehicle leveling device having a stand which, in use, is positioned on the ground next to a wheel of a vehicle, a lever beam which extends laterally from the stand and beneath the wheel with a proximal end portion of the lever beam being mounted on the stand for movement between raised and lowered positions and a distal end portion of the lever beam resting on the ground beneath the vehicle, a jack for raising the proximal end portion of the lever beam on the stand, with the distal end portion bearing on the ground and serving as a fulcrum for the lever beam in lifting the wheel, and a lock for holding the proximal end portion of the lever beam in a fixed position on the stand with the wheel in a raised position.

DETAILED DESCRIPTION

Figure 1:
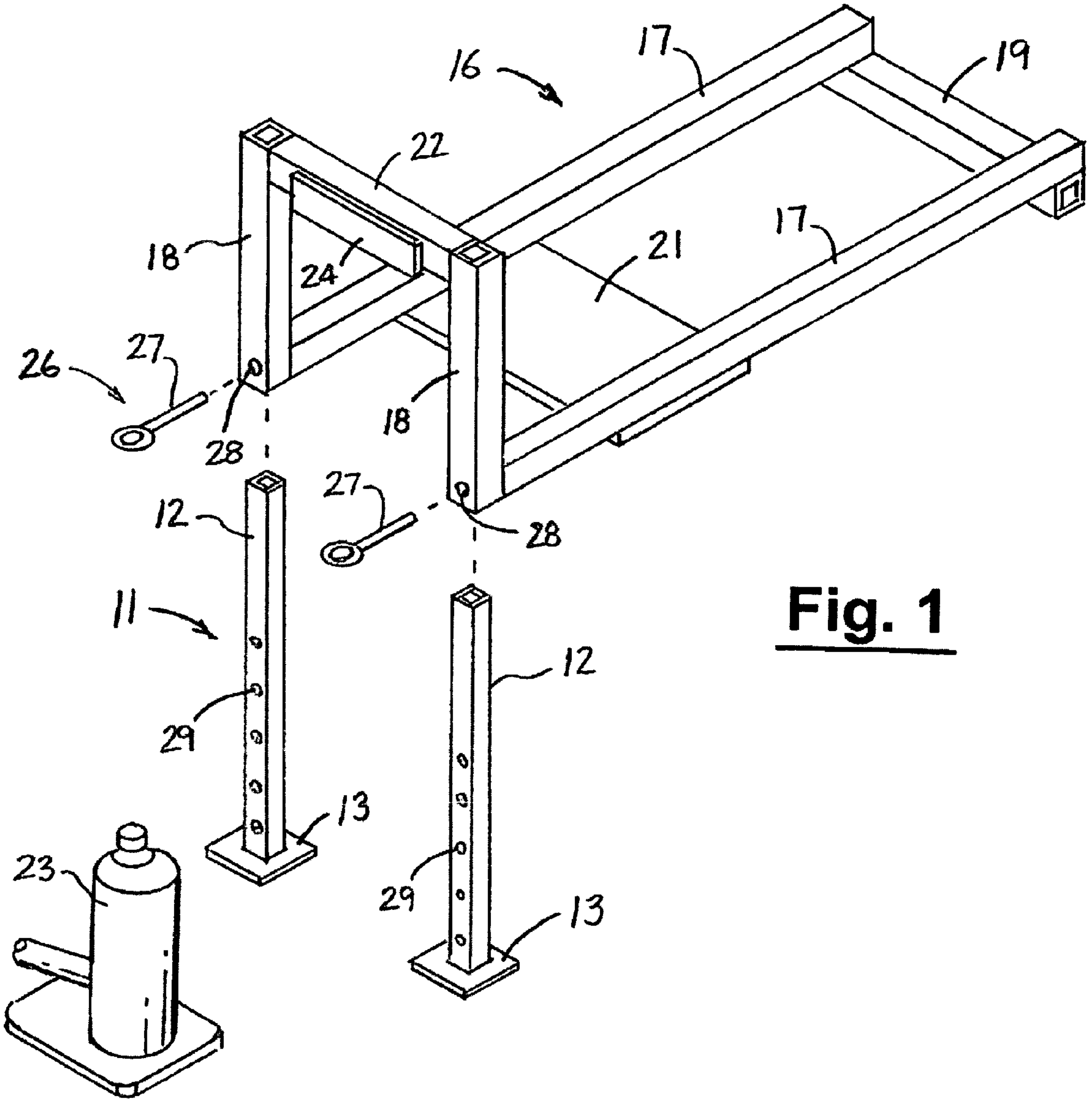
FIG. 1 is an exploded isometric view of one embodiment of a vehicle leveling device according to the invention.

As illustrated in the drawings, the leveling device has a stand 11 which, in use, is placed on the ground next to the wheel of a vehicle to be raised. In the embodiment shown, the stand has a pair of upstanding posts 12, with a ground engaging pad or foot 13 at the lower end of each of the posts. Alternatively, if desired, the stand could have a single, or common, base for the two posts, rather than the individual pads. The two posts are spaced apart and parallel to each other.

A lever beam 16 is mounted on the stand for movement between raised and lowered positions. In the embodiment illustrated, the lever beam has a pair of spaced apart, generally parallel arms 17, 17 which extend laterally from the stand, with sleeves 18, 18 at the proximal ends of the arms and a cross member 19 extending between the distal end portions of the arms. The sleeves are slidably mounted on the posts for movement between raised and lowered positions, with the cross member engaging the ground and serving as a fulcrum for the lever beam. A plate 21 extends between the proximal end portions of the arms near the sleeves.

A bridge beam 22 extends between the upper end portions of the sleeves and constrains the sleeves for movement in concert along the posts. A jack 23 is positioned beneath the bridge beam for moving the proximal end of the lever beam between raised and lowered positions on the stand, and depending flanges 24 extend along the lower edges of the bridge beam to prevent it from slipping off the jack. In one presently preferred embodiment, the jack is a hydraulic bottle jack, but any suitable type of jack can be used. Since the jack is not an integral part of the device, it can be moved from one device to another and/or used for other purposes.

A lock 26 is provided for holding the proximal end of the lever beam in a fixed position on the stand. In the embodiment illustrated, the lock consists of pins 27 which are inserted through aligned openings 28, 29 in sleeves 18 and posts 12.

Figure 2:
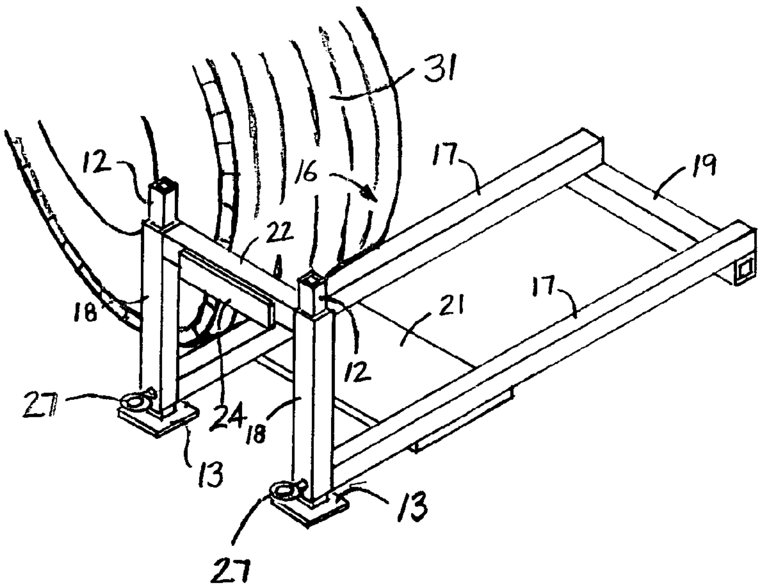
FIG. 2 is an isometric view illustrating the embodiment of FIG. 1 positioned behind the wheel of a vehicle.
Figure 3:
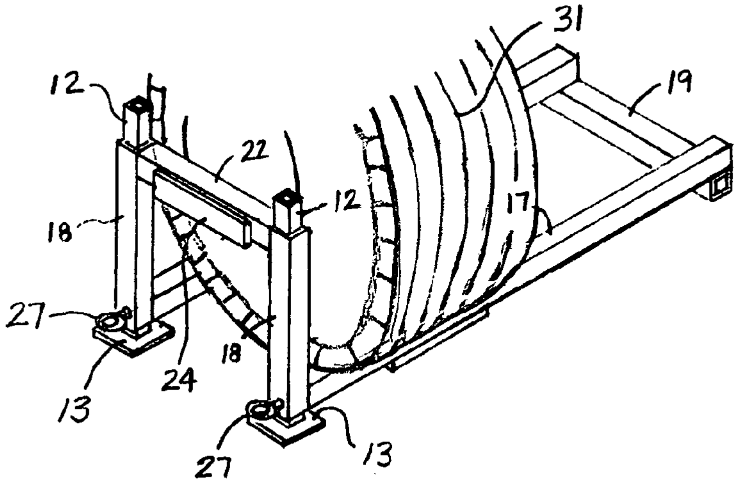
FIG. 3 is an isometric view illustrating the embodiment of FIG. 1 positioned beneath the wheel of a vehicle.

In use, one of the devices is placed on the ground in front of or behind each if the wheels 31 to be raised, with the stand 11 next to the wheel and the lever beam 16 resting on the ground in its lowermost position and extending beneath the vehicle, as shown in FIG. 2. The vehicle is then rolled onto the lever beams, as shown in FIG. 3, with the tires being centered above beam arms 17, 17 and cross plates 21. The jack 23 is then inserted beneath the bridge 22 of one of the devices and, with pins 27 removed, the jack is extended until it engages the under side of the bridge and then raises the outer end of the lever beam and the wheel 31 resting on the lever beam.

As the outer or proximal end of the lever beam is raised, the cross member 19 at the distal ends of the arms bears against the ground and serves as a fulcrum for the lever beam and the wheel being lifted by it. Since the jack is spaced farther from the fulcrum than the wheel, the lever beam provides a mechanical advantage for the jack in raising the wheel.

Figure 4:
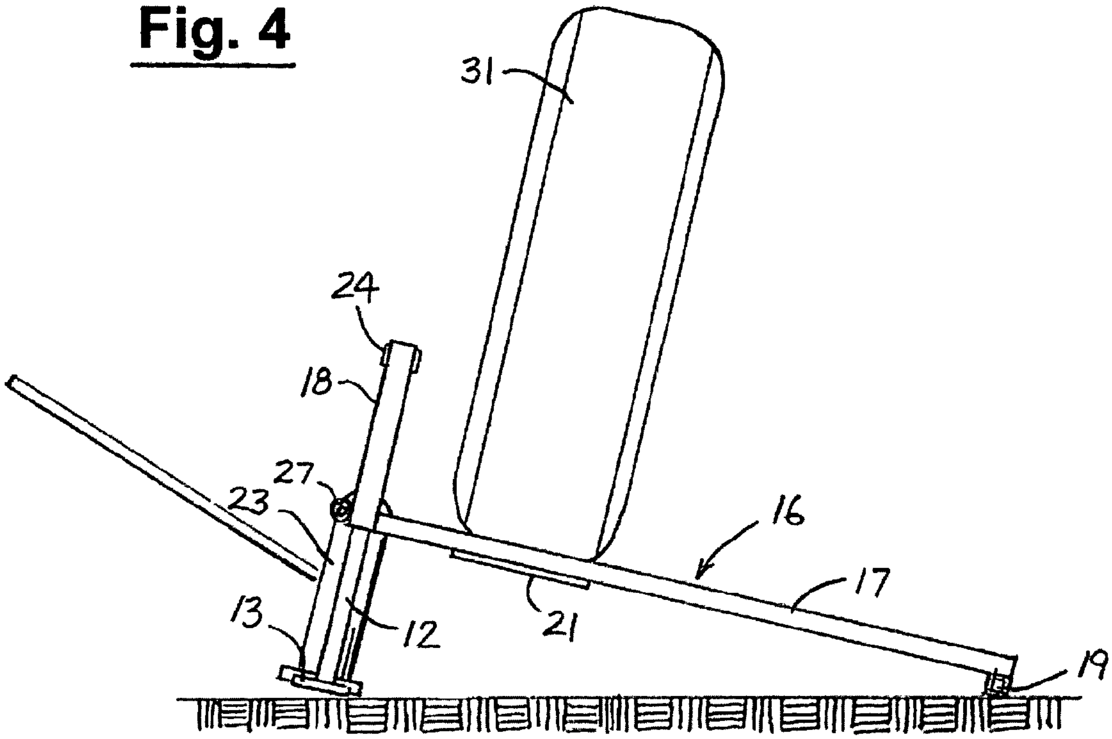
FIG. 4 is a front elevational view showing the embodiment of FIG. 1 in a raised position beneath the wheel of a vehicle.

As the outer end of the lever beam is raised, the stand tips in an inward direction, as shown in FIG. 4, with the inner edges of pads 13 digging into the ground to anchor the device in place.

When the wheel has reached the desired height, pins 27 are inserted through openings 28 in sleeves 18 and the corresponding openings 29 in posts 12 to hold the wheel at the desired height. With the lever arm thus locked, the jack can be lowered, removed, and moved to another wheel.

Lowering the vehicle is the converse of leveling it. The jack is engaged with each successive leveling device, raised to permit removal of the pin, and then lowered until the lever beam is back on the ground. The jack can then be lowered further, removed and moved to the next device. After all of the lever beams are back on the ground, the vehicle is rolled off them.

Figure 5:
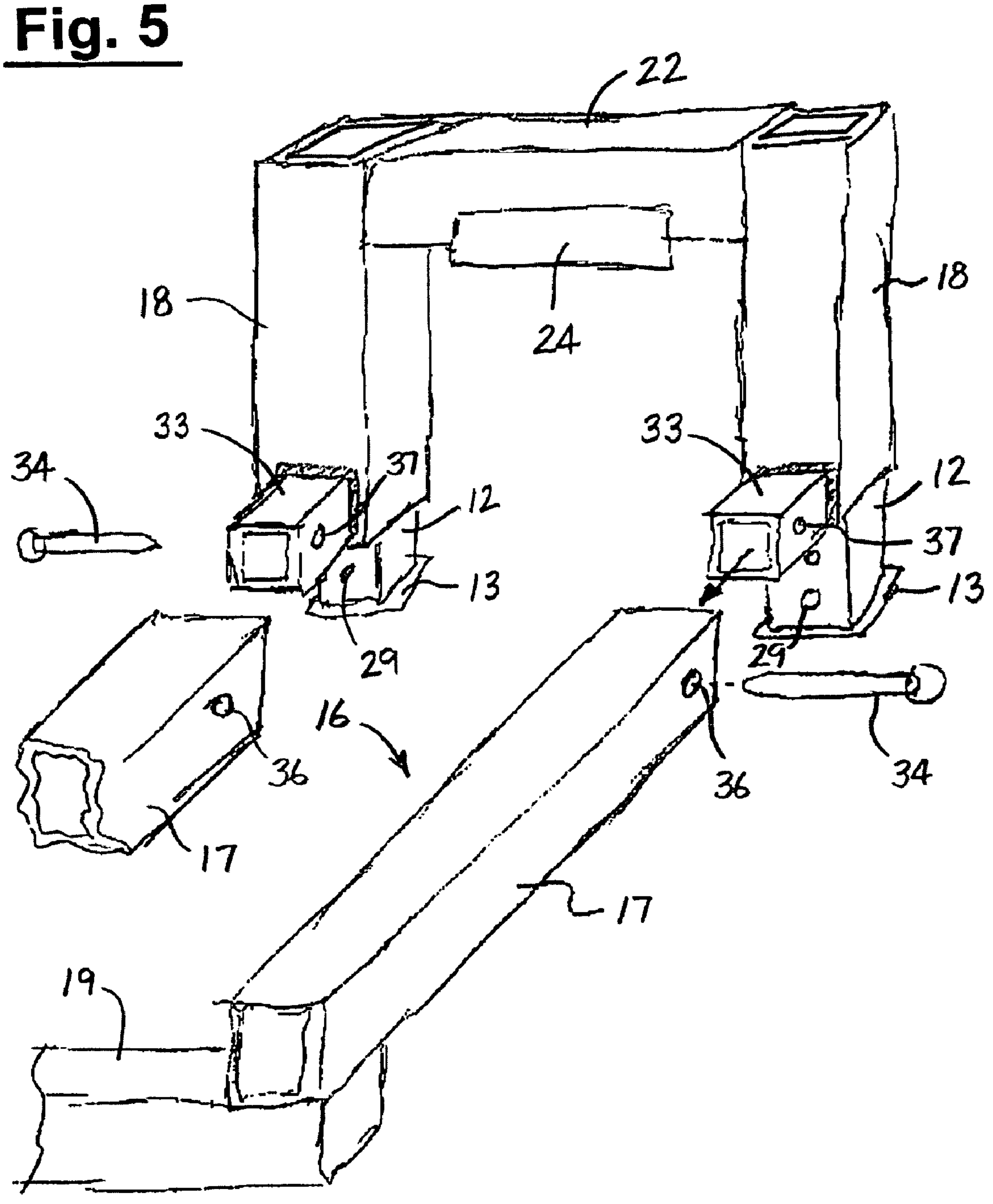
FIG. 5 is a fragmentary, exploded isometric view of another embodiment of a vehicle leveling device according to the invention.

The embodiment shown in FIG. 5 is generally similar to the embodiment of FIG. 1, and like reference numerals designate corresponding elements in the two embodiments. In the embodiment of FIG. 5, however, the arms 17, 17 of lever beam 16 are removably attached to sleeves 18, 18, which permits the device to be folded flat for storage.

As shown In FIG. 5, stub arms 33 extend laterally from the lower portions of sleeves 18 and are received in the proximal end portions of lever beam arms 17. The stub arms are rigidly affixed to the sleeves by welding or other suitable means, and the lever beam arms are retained on the stub arms by pins 34 which are received in aligned openings 36, 37 in the respective arms.

Operation and use of the embodiment of FIG. 5 is similar to that of the embodiment of FIG. 1 except that when the device is not in use, the elongated arms of the lever beam can be removed and folded flat against the stand.

Alternatively, if desired, the lever beam arms can be pivotally connected to the sleeves, which will also permit them to be folded flat against the stand for storage.

The invention has a number of important features and advantages. It permits recreational vehicles and the like to be leveled quickly, easily and accurately without the use of blocks or other trial and error techniques and without using a separate jack for each wheel. It is stronger and can lift greater loads than leveling devices heretofore provided, and it can also lift them higher.

It is apparent from the foregoing that a new and improved vehicle leveling device has been provided. While only certain presently preferred embodiments have been described in detail, as will be apparent to those familiar with the art, certain changes and modifications can be made without departing from the scope of the invention as defined by the following claims.

The invention claimed is:

1. A vehicle leveling device, comprising a stand which, in use, is positioned on the ground beside one wheel of a vehicle, a lever beam which extends laterally from the stand and beneath the one wheel with a proximal end portion of the lever beam being mounted on the stand for movement between raised and lowered positions, a cross member on the under side of the lever beam resting on the ground beneath the vehicle, a jack for raising the proximal end portion of the lever beam on the stand, with the cross member bearing on the ground and serving as a fulcrum for the lever beam in lifting the one wheel, and a lock for holding the proximal end portion of the lever beam in a fixed position on the stand with the one wheel in a raised position.

2. The device of claim 1 wherein the stand has a base which rests on the ground and an upstanding post on which the proximal end portion of the lever beam is slidably mounted.

3. The device of claim 2 wherein the proximal end portion of the lever beam includes a sleeve which is slidably mounted on the post, and the lock comprises a pin which extends through aligned openings in the sleeve and the post.

4. A vehicle leveling device, comprising:

a stand having a pair of upstanding posts;

a lever beam having a pair of spaced apart generally parallel arms which extend laterally from the stand, with sleeves at the proximal ends of the arms mounted on the posts for movement between raised and lowered positions and a cross member which extends between the distal end portions of the arms on the under side of the arms;

a bridge extending between the sleeves;

a jack engagable with the bridge for lifting the proximal ends of the arms, with the cross member engaging the ground and serving as a fulcrum for the lever beam; and a lock for holding the proximal ends of the lever beam arms in a raised position on the stand.

5. The device of claim 4 wherein each of the upstanding posts has a ground engaging foot at the lower end thereof.

6. The device of claim 4 wherein the lock comprises pins which extend through aligned openings in the sleeves and the posts.

7. The device of claim 4 wherein the jack is a hydraulic jack.

8. The device of claim 4 wherein the jack can be disengaged from the bridge and removed from the device when the lever beam is locked in the raised position.

9. The device of claim 4 including a plate which extends between the lever beam arms near the proximal ends of the arms.

10. The device of claim 4 wherein the arms are attached to the sleeves in a manner which permits the arms to be folded substantially flat against the stand for storage.

11. A vehicle leveling device, comprising a stand which is positioned on the ground beside one wheel of a vehicle, a lever beam which extends laterally from the stand and beneath the one wheel, with a proximal end portion of the lever beam mounted on the stand and a cross member on the under side of a distal end portion of the lever beam resting on the ground beneath the vehicle, and a jack for raising the proximal end portion of the lever beam relative to the stand, with the cross member bearing on the ground and serving as a fulcrum for the lever beam in lifting the one wheel.

12. The device of claim 11 wherein the stand has a base which rests on the ground and an upstanding post on which the proximal end portion of the lever beam is slidably mounted.

13. The device of claim 11 including a lock for holding the proximal end portion of the lever beam in a raised position on the stand.

14. The device of claim 11 wherein the lever beam has a pair of spaced apart generally parallel arms, with sleeves at the proximal ends of the arms slidably mounted on the stand for movement between raised and lowered positions, and the cross member extending beneath and between the distal end portions of the arms.

15. The device of claim 14 wherein the arms are removably attached to the sleeves.

16. The device of claim 11 wherein the jack is a hydraulic jack.

* * * * *